(12) United States Patent
Masuki

(10) Patent No.: US 8,077,410 B2
(45) Date of Patent: Dec. 13, 2011

(54) OPTICAL APPARATUS AND IMAGE PICKUP APPARATUS PROVIDED WITH THE OPTICAL APPARATUS

(75) Inventor: Akihiko Masuki, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 12/743,709

(22) PCT Filed: Dec. 18, 2008

(86) PCT No.: PCT/JP2008/073669
§ 371 (c)(1),
(2), (4) Date: May 19, 2010

(87) PCT Pub. No.: WO2009/093405
PCT Pub. Date: Jul. 30, 2009

(65) Prior Publication Data
US 2010/0284097 A1 Nov. 11, 2010

(30) Foreign Application Priority Data
Jan. 21, 2008 (JP) ................................. 2008-010445

(51) Int. Cl.
*G02B 7/02* (2006.01)
(52) U.S. Cl. .......................... 359/819; 359/694; 359/822
(58) Field of Classification Search .......... 359/694–701, 359/811–824, 740, 554, 557; 396/55; 348/208.99
See application file for complete search history.

(56) References Cited

U.S. PATENT DOCUMENTS

| 5,416,558 A * | 5/1995 | Katayama et al. ............... 396/52 |
| 6,011,927 A * | 1/2000 | Kamata ........................... 396/55 |
| 7,529,476 B2 | 5/2009 | Kurosawa ........................ 396/55 |
| 2006/0164516 A1 | 7/2006 | Kurosawa .................. 348/208.9 |
| 2008/0175573 A1 | 7/2008 | Iijima ............................. 396/55 |

FOREIGN PATENT DOCUMENTS

JP 10-090744 A 4/1998
(Continued)

OTHER PUBLICATIONS

PCT/IB/326 (PCT Notification Concerning Transmittal of International Preliminary Report on Patentability); PCT/IB/373 (PCT International Preliminary Report on Patentability); PCT/ISA/237 (PCT Written Opinion of the International Searching Authority).

*Primary Examiner* — Mohammed Hasan
(74) *Attorney, Agent, or Firm* — Cowan, Liebowitz & Latman, P.C.

(57) ABSTRACT

Provided is an optical apparatus including: two magnets which are constituent components of drive member for moving a lens holder (21); three balls (25); and two bias members (23) for applying biases such that hook portions disposed in one and the other ends of each of the two bias members are engaged with a base member (28) and the lens holder, respectively, and the three balls are held between the base member and the lens holder. Two magnets (22A and 22B), the three balls, and the two bias members are arranged so that a center of gravity within a plane of the base member, a lens, and the two magnets is positioned in a triangle formed by the three balls, and a line segment within a plane formed by the two bias members steps over two sides of the triangle.

7 Claims, 12 Drawing Sheets

FOREIGN PATENT DOCUMENTS

| | | |
|---|---|---|
| JP | 2006-203624 A | 8/2006 |
| JP | 2007-199320 A | 8/2007 |
| JP | 2008-065179 A | 3/2008 |
| JP | 2008-083331 A | 4/2008 |
| JP | 2008-180774 A | 8/2008 |
| JP | 2008-191267 A | 8/2008 |
| JP | 2008-304693 A | 12/2008 |
| WO | 2007/136053 A | 11/2007 |

\* cited by examiner

OPTICAL APPARATUS AND IMAGE PICKUP APPARATUS PROVIDED WITH THE OPTICAL APPARATUS

TECHNICAL FIELD

The present invention relates to an optical apparatus for correcting image blurring, and an image pickup apparatus provided with the optical apparatus.

BACKGROUND ART

Conventionally, for correcting image blurring caused by hand shaking which easily occurs in handheld photography, there has been known an optical apparatus (optical image stabilizing unit) that eliminates image blurring by shifting an image blur correction lens included in an image pickup lens in a plane perpendicular to an optical axis.

As such an optical apparatus described above, there has been known an apparatus that shifts a correction lens in a first direction or a second direction (direction perpendicular to the first direction) without rotating the correction lens around an optical axis.

Japanese Patent Application Laid-Open No. H10-090744 discloses a configuration in which, as illustrated in FIG. 14, a lens holder 102 holding a correction lens 101 is supported by three balls 103, 104, and 105, and held in a base member 109 through three springs 106, 107, and 108 arranged outside the three balls to thereby move the lens holder 102 in a plane orthogonal to an optical axis.

As illustrated in FIG. 15, the lens holder 102 and a drive member 110 are disposed between the base member 109 and a base member 111, and protection lenses 112 and 113 are fixed to at least one of openings of both ends of those base members 109 and 111. Thus, the lens holder 102 and the drive member 110 are configured to form a casing with the base members 109 and 111 and the protection lenses 112 and 113. As a result, the configuration prevents exposure of the lens holder 102 and the drive member 110 to an outside, and improves workability of incorporating an optical apparatus into a lens barrel.

DISCLOSURE OF THE INVENTION

The present invention has been made in view of the above-mentioned problem, and it is an object of the present invention to provide an optical apparatus capable of reducing the number of components and improving assembling performance, and an image pickup apparatus provided with the optical apparatus.

In order to achieve the above-mentioned object, according to an aspect of the present invention, there is adopted an optical apparatus, comprising:

a lens holding frame which holds a lens;
a base member;
a lens holder which holds an image blur correction lens, the lens holder being movable with respect to the base member within a plane orthogonal to an optical axis of an optical system of the lens held by the lens holding frame;
drive unit which moves the lens holder with respect to the base member;
three balls arranged between the base member and the lens holder; and
two bias members which bias the lens holder toward the base member so as to hold the three balls between the base member and the lens holder, each of the two bias members including hook portions which are disposed at both ends thereof and engaged with hook engaging portions of the base member and the lens holder, wherein when an optical axis of the image blur correction lens is in a position matching the optical axis of the lens held by the lens holding frame, a center of gravity of the lens holder is positioned in a triangle formed by the three balls within the plane, and wherein the hook engaging portions at two places of the lens holder are arranged in a manner that a line segment interconnecting the hook engaging portions at the two places of the lens holder within the plane intersects two sides of the triangle when seen from a direction of the optical axis.

Other objects and features of the present invention become apparent upon reading the following description and drawings.

BEST MODE FOR CARRYING OUT THE INVENTION

A best mode for carrying out the present invention is as described in the following embodiment.

Embodiment

Figure 1:
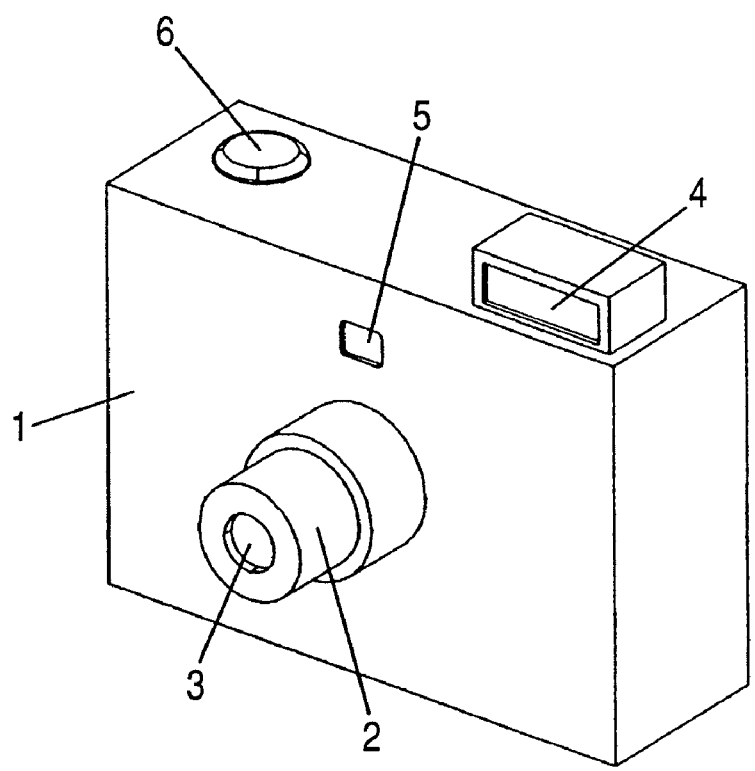
FIG. 1 is a perspective view illustrating a camera according to an embodiment of the present invention.

FIG. 1 is a perspective view illustrating a camera which is an image pickup apparatus including an optical apparatus according to an embodiment of the present invention.

In FIG. 1, the camera includes a camera main body 1, a lens barrel 2 capable of changing a focal length of an image pickup lens, and a finder window 5 which are disposed in the front of the camera main body 1, and a lens barrier apparatus 3 that opens/closes an optical path of the image pickup lens (opened state in FIG. 1) according to power-ON/OFF of the camera, which is disposed in the front of the lens barrel 2.

In the top of the camera main body 1, a light emitting window portion 4 that constitutes a strobe apparatus for irradiating an object with an illumination light is disposed. Additionally, in the top of the camera main body 1, a release button 6 for starting a photographing preparation operation (focus adjusting operation and photometry operation) and a photographing operation (exposure of film or CCD to image pickup device) is disposed.

FIG. 1 is a representative schematic view of the camera. The present invention is not limited to the above-mentioned configuration.

Figure 2:
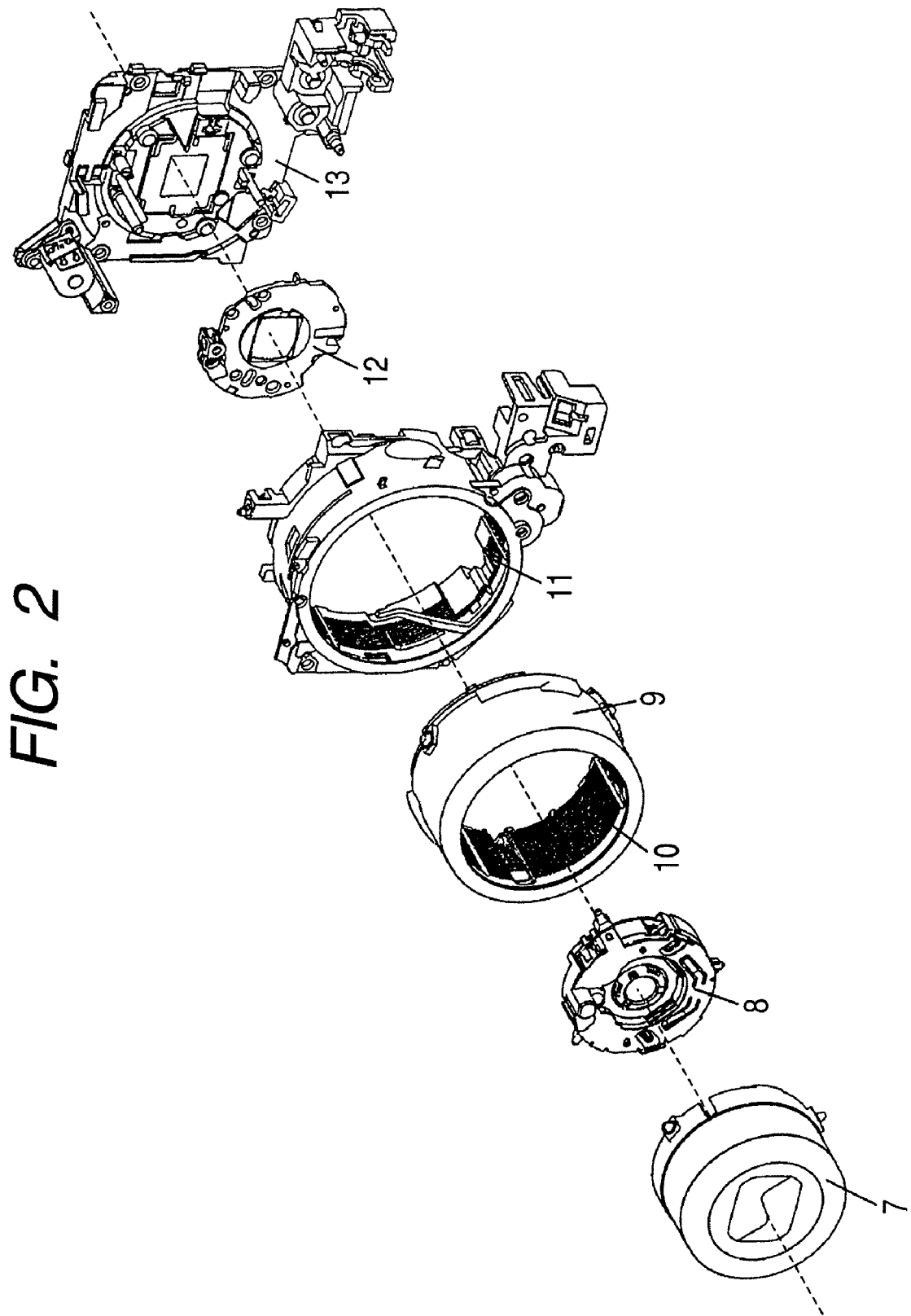
FIG. 2 is an exploded perspective view illustrating an entire lens barrel of the camera of the embodiment of the present invention.

FIG. 2 is an exploded perspective view of the lens barrel 2.

In FIG. 2, the lens barrel 2 includes: a one-unit lens barrel 7 which includes a lens holding frame for holding a first unit lens, and the lens barrier apparatus 3; a two-unit lens barrel 8 which includes a lens holding frame for holding a second unit lens, an optical apparatus, and a shutter and stop mechanism which are described below; a moving cam ring 9 which includes a drive cam disposed in its inner peripheral portion to drive the one-unit lens barrel 7 and the two-unit lens barrel 8, and a gear portion to which a motive force is transmitted from a barrel drive motor (not shown); a translatory guiding cylinder 10 rotatably held by the moving cam ring 9 to regulate translatory movements of the one-unit lens barrel 7 and the two-unit lens barrel 8; a fixed cylinder 11 which includes a drive cam disposed in its inner peripheral portion to drive the moving cam ring 9; a three-unit lens barrel 12 which includes a lens holding frame for holding a third unit lens; and a base member 13 which includes an image pickup device.

A configuration of the lens barrel 2 is not limited to the above-mentioned configuration as long as characteristics of the present invention are satisfied.

Figure 3:
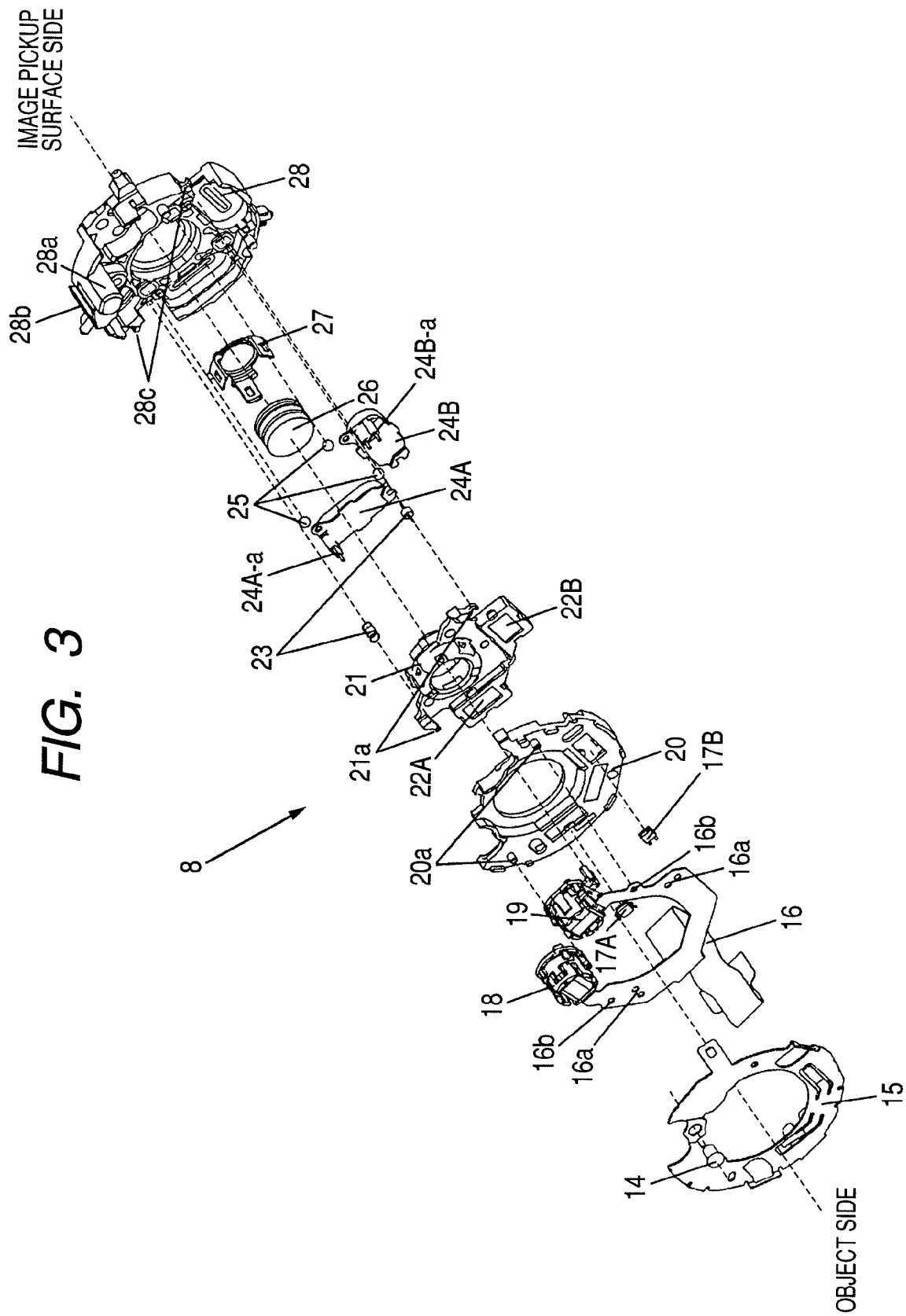
FIG. 3 is an exploded perspective view illustrating a two-unit lens barrel of the camera of the embodiment of the present invention.
Figure 4:
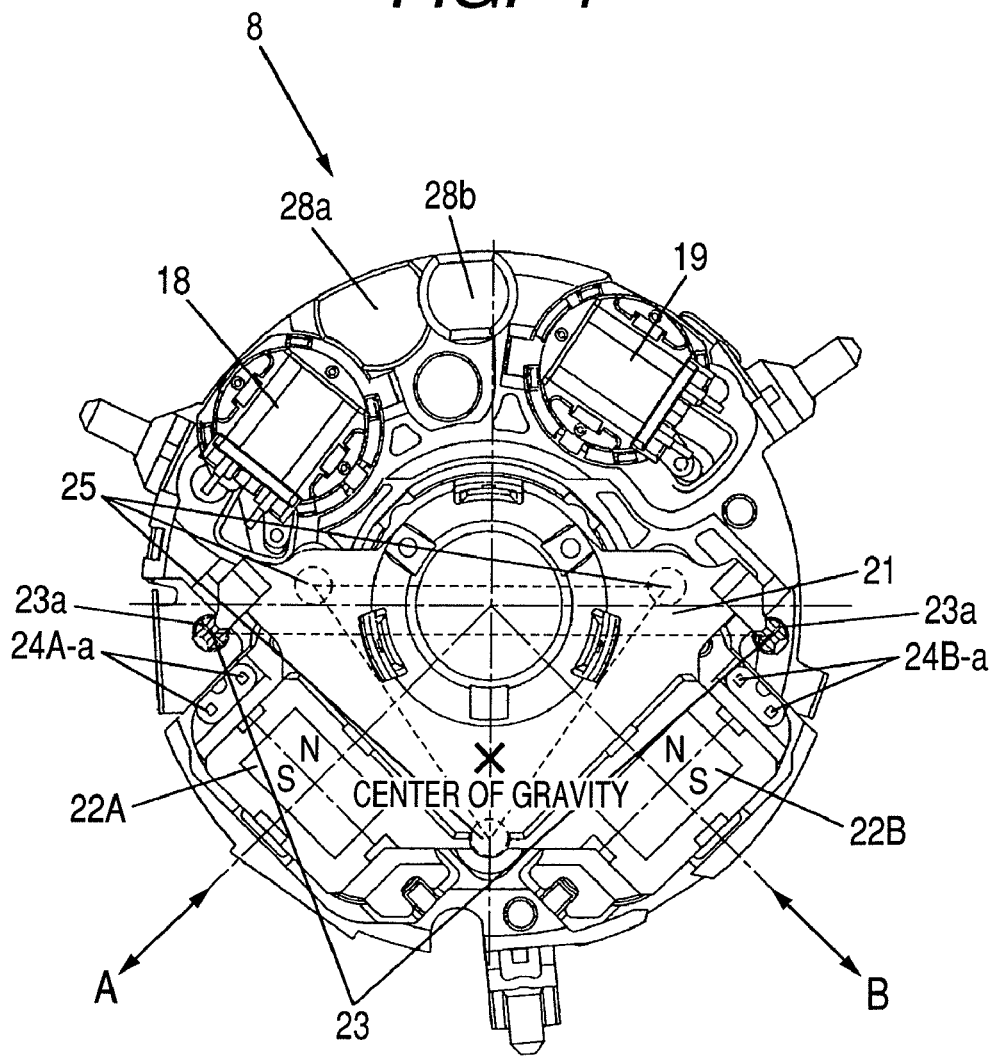
FIG. 4 is a plan view illustrating an optical apparatus included in the camera of the embodiment of the present invention.
Figure 5:
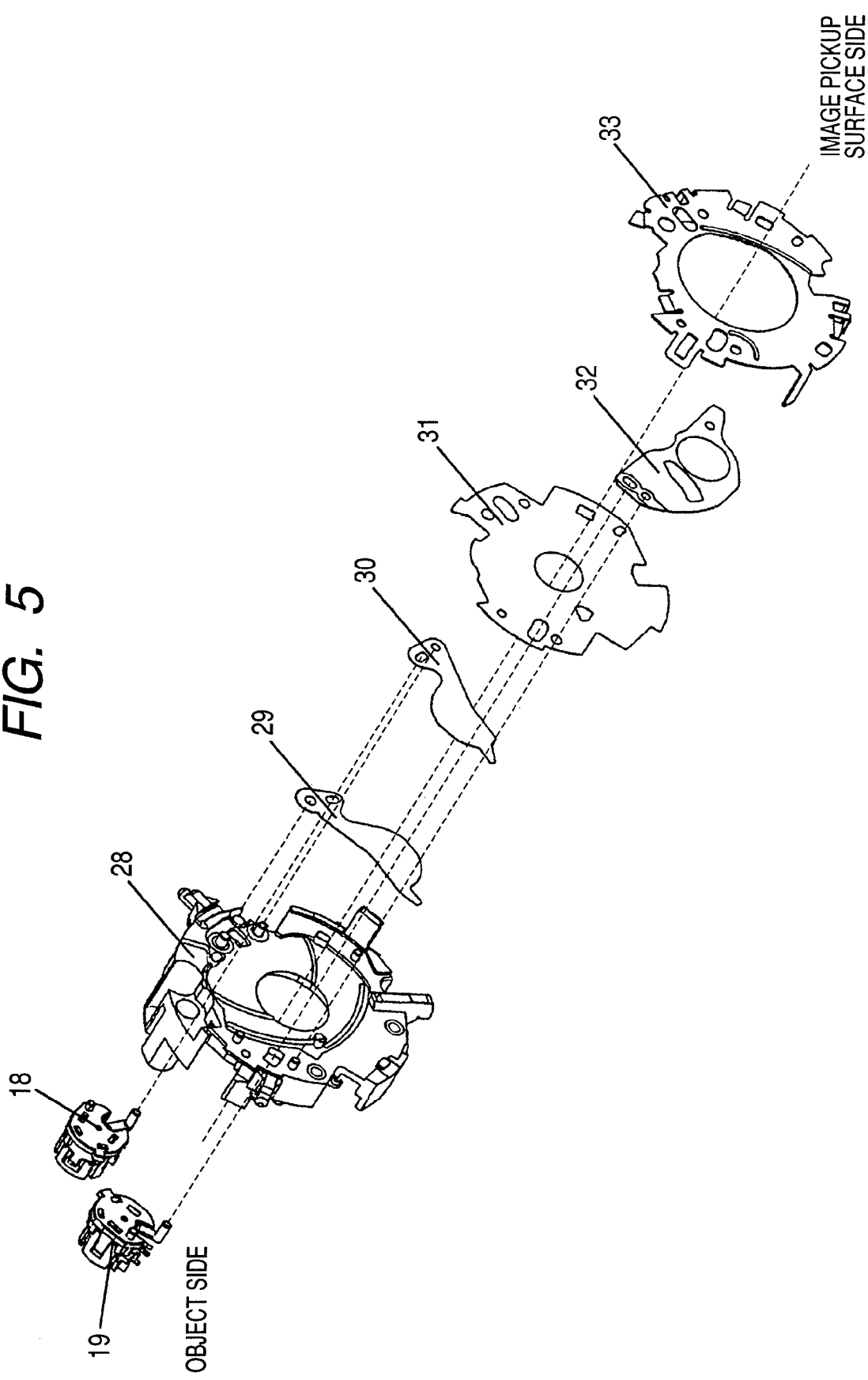
FIG. 5 is an exploded perspective view illustrating a shutter and ND mechanism of the camera of the embodiment of the present invention.

Next, referring to FIGS. 3 to 5, a configuration of the two-unit lens barrel 8 which includes the optical apparatus, and the shutter and stop mechanism is described. FIG. 3 is an exploded perspective view of the two-unit lens barrel 8, FIG. 4 is an exploded perspective view of the two-unit lens barrel 8 as viewed from an object side (in a state without sensor holder, two-unit FPC, and two-unit cover which are described below), and FIG. 5 is an exploded perspective view of the two-unit lens barrel 8 as viewed from the opposite side of FIG. 3.

In FIGS. 3 to 5, the two-unit lens barrel 8 includes a two-unit base member 28 which serves as a base for the two-unit lens barrel 8 and includes a recess-shaped portion 28a for a focus feed screw (not shown), a recess-shaped portion 28b for a focus guide bar (not shown), and hook engaging portions 28c described below. The lens barrel 2 is downsized by shortening intervals between the lens unit barrels in a retracted state. However, the focus feed screw (not shown) and the focus guide bar (not shown) protrude in an optical axis direction, so that the focus feed screw and the focus guide bar penetrate the two-unit base member 28 in the retracted state. Rays that have not passed through any lenses pass through the penetrated portion to enter the image pickup device, that is, light leak may occur. Thus, bag shapes (refer to FIG. 4) such as the recess-shaped portions 28a and 28b are formed to prevent leakage of rays as much as possible.

The two-unit lens barrel 8 further includes a two-unit lens holder 21 which holds a two-unit lens unit (hereinafter referred to as correction lens) 26, and the correction lens 26 is swaged in the two-unit lens holder. The two-unit lens holder 21 integrally holds magnets 22A and 22B. The subscripts A and B of the reference symbols correspond to A and B directions shown in FIG. 4. The two-unit lens holder 21 includes hook engaging portions 21a (see FIG. 3) in two positions, and springs 23 (coil springs) which are bias members for applying tensile forces are hung thereon, respectively.

The two-unit lens barrel 8 further includes a fixed stop 27 which cuts off a maleficence light, which is fixed to the two-unit lens holder 21 by the hook engaging portions 21a, and coil units 24A and 24B constituted by coils and bobbins, which are fixed to recesses of the two-unit base member 28 by adhesive. Power is supplied to the coils through metal pins 24A-a and 24B-a (see FIGS. 3 and 4) embedded in the bobbins and electrically connected to the coils by a two-unit flexible printed circuit (FPC) described below.

The other ends of the two springs 23 hung on the two-unit lens holder 21 are hung on the hook engaging portions 28c (see FIG. 3) of the two-unit base member 28, and three non-magnetic balls 25 (see FIGS. 3 and 4) are sandwiched between the two-unit base member 28 and the two-unit lens holder 21. The two-unit lens holder 21 is in a state of being pressed to the two-unit base member 28 via the balls 25. However, the two-unit lens holder 21 can freely move in a plane perpendicular to an optical axis because the two-unit lens holder 21 is pressed via the balls 25. In other words, the two-unit lens holder 21 can move relative to the two-unit base member in a plane perpendicular to an optical axis of a first lens unit held by the one-unit lens barrel which is a lens holding frame or a third lens unit held by the three-unit lens barrel which is also a lens holding frame. The two-unit lens holder 21 is moved in the plane, to thereby suppress and correct image blurring in the image pickup device.

The two-unit lens barrel 8 further includes an actuator 18 which drives a shutter blade, and an actuator 19 which drives an ND filter. Both are actuators of two-point switching types in which stopping position of an arm is switched by changing the direction of the electric current. The two-unit lens barrel 8 further includes a two-unit FPC 16 having an overall shape being semicircular (see FIG. 3). The actuators 18 and 19 are soldered to both ends of the semicircular shape, and lands 16a are disposed in the midway to be soldered to the coil units. In the backside, hall devices 17A and 17B are mounted to detect magnetic fields.

The magnets 22A and 22B held by the two-unit lens holder 21 are polarized in a direction illustrated in FIG. 4. Movements of the two-unit lens holder 21 in A and B directions are detected as changes in magnetic field by the hall devices 17A and 17B, and moving amounts are calculated based on the changes. Positional accuracy of the magnets 22A and 22B, and the hall devices 17A and 17B is important. Thus, the hall devices 17A and 17B are pressed into a sensor holder 20 to be accurately positioned.

The two-unit FPC 16 as described above is fixed by engaging between a positioning hole 16b and a positioning projection 20a of the sensor holder 20 (see FIG. 3), and the sensor holder 20 is mounted to the two-unit base member 28. Then, a two-unit cover 15 is fixed to the two-unit base member 28 by a screw 14 and an outer peripheral hook, whereby the sensor holder 20, and the actuators 18 and 19 are fixed to the two-unit base member 28.

In FIG. 5, the two-unit lens barrel 8 further includes shutter blades 29 and 30 which are driven by a drive arm of the actuator 18, a partition plate 31 and an ND filter 32 for restricting an amount of light, which are driven by the actuator 19 to repeatedly advance into or retreat from an optical path, and a shutter cover 33 which is fixed to the two-unit base member 28 by a hook to protect the shutter blades 29 and 30, and the ND filter 32.

Next, referring to FIG. 4, stability of the two-unit lens holder 21 which holds the correction lens 26 with respect to the two-unit base member 28 is described.

The two-unit lens holder 21 is formed by a mold member, and includes the correction lens 26, and the magnets 22A and 22B as described above. Thus, its own weight is mainly determined by weights of the correction lens 26, and the magnets 22A and 22B. In other words, a state of driving the two-unit lens holder 21 is a state where the magnets 22A and 22B are mounted to the two-unit lens holder 21 and the correction lens 26 is held. At the time of starting driving for image blur correction, the two-unit lens holder 21 is lifted, by driving forces of the magnets 22A and 22B and the coil units 24A and 24B, against its weight so that a center of the correction lens 26 can match an optical axis of another photographing lens optical system, in other words, the correction lens 26 can be at a center position.

FIG. 4 shows a state where the two-unit lens holder 21 is lifted so that an optical axis of the correction lens 26 matches that of another photographing lens optical system (first lens unit or third lens unit). In this case, a center of gravity of the two-unit lens holder 21 that has the magnets 22A and 22B mounted thereto and holds the correction lens 26, in other words, a center of gravity of the two-unit lens holder 21 in its driven state, is a position (position indicated by "x center of gravity") illustrated in FIG. 4. The three balls 25 are arranged in a manner that a triangle formed by the three balls 25 (indicated by broken lines because they are located in backside) for receiving the two-unit lens holder 21 includes the center of gravity, whereby the two-unit lens holder 21 can be stably held. For example, if the three balls 25 are arranged in a manner that the triangle formed by the three balls 25 does not include the center of gravity, the two-unit lens holder 21 falls toward the center of gravity side to be disabled from moving in a plane orthogonal to the optical axis. Auxiliary balls may be provided in addition to the three balls 25, and the two-unit lens holder 21 may be received by four or more balls.

The two springs 23 which are bias members are hung in parallel with the optical axis direction between the two-unit lens holder 21 and the two-unit base member 28, as described above (see FIGS. 3 and 4). Thus, by hanging the springs 23 so that the two-unit lens holder 21 and the two-unit base member 28 push each other, the three balls 25 are sandwiched therebetween. Then, a line segment between the two hook engaging portions 21a at which the two springs 23 hang on the two-unit lens holder 21 traverses two sides of the triangle formed by the three balls 25 (see broken line in FIGS. 3 and 4). In short, the line segment formed by the two hook engaging portions 21a only needs to be arranged to intersect the two sides of the triangle formed by the three balls 25 when viewed from the optical axis direction.

In this embodiment, the two-unit lens holder 21 has a laterally symmetrical shape, and the magnets 22A and 22B are arranged to be laterally symmetrical. Thus, preferably, the line segment formed by the two hook engaging portions 21a traverses the two sides of the triangle, and the two hook engaging portions 21a can be positioned at distances equal from a symmetrical axis. In other words, setting of a point where forces of the two springs are combined on the symmetrical axis in the triangle is a condition which enables maintenance of highest stability. In other words, while the two springs 23 hung on the two-unit lens holder 21 are freely hung on any places of the triangle, the springs 23 are preferably arranged equally from the symmetrical axis to assure stability of the optical apparatus.

Next, referring to FIGS. 6 to 13, specific hanging of the two springs 23 to prevent rolling is described in comparison with conventional hanging of the spring.

Figure 6:
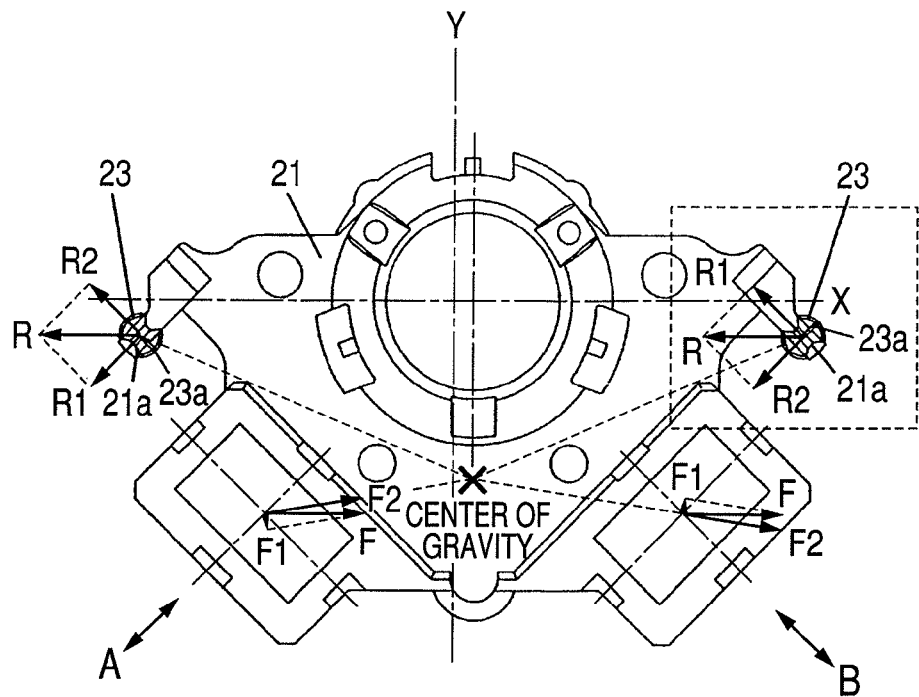
FIG. 6 is a view illustrating a force applied (in X direction) to a lens holder of the embodiment of the present invention.
Figure 12:
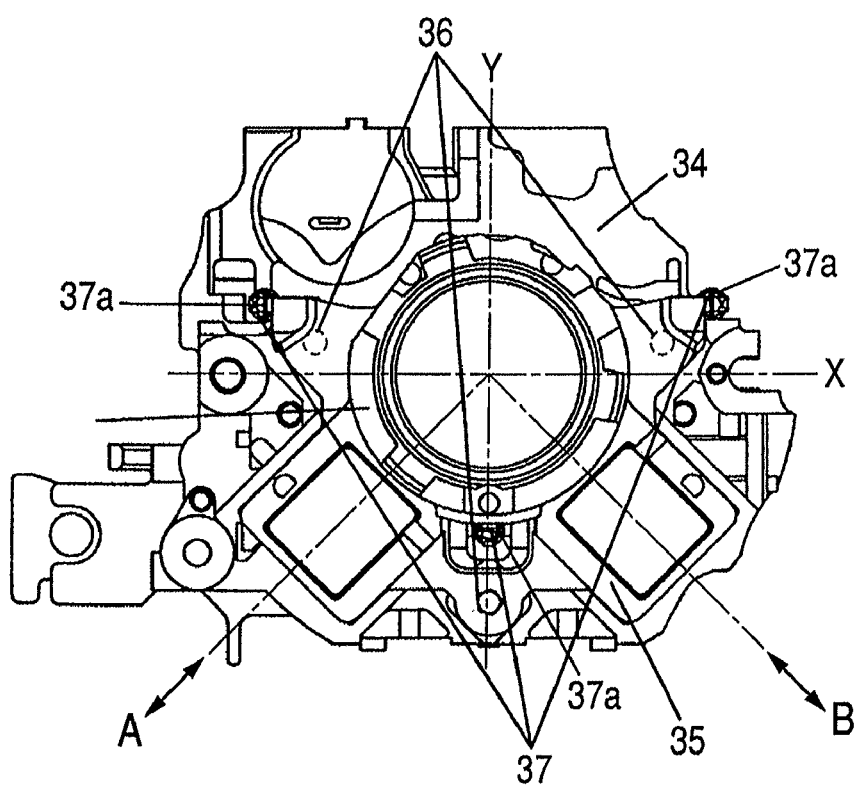
FIG. 12 is a plan view illustrating a lens holder and a base member of an optical apparatus included in a conventional camera.

As illustrated in FIG. 6, the rolling means a phenomenon in which force is applied to the two-unit lens holder 21 to be rotated about the center of gravity of the two-unit lens holder 21 when a driving force for image blur correction is applied as a resultant force F. In this case, a component force F1 of the force F causes the two-unit lens holder 21 to rotate counter-clockwise about the center of gravity. The rolling damages the image blur correction performance. Thus, conventionally, as illustrated in FIG. 12, three springs 37 are hung between a base member 34 and a lens holder 35. The center spring 37 serves to not only stabilize a spring force applied to the lens holder 35 but also reduce the rolling.

In this embodiment, there is no spring equivalent to the conventional center spring, and the number of springs 23 is only two. Consequently, it is likely to be affected by the rolling. However, planes formed by hook portions 23a which are one ends of the two springs 23 are set parallel to axial directions of the driving directions A and B for the purpose of image blur correction. Specifically, in FIG. 4 and FIG. 6 described below, the plane formed by the hook portion 23a of the right spring 23 is set parallel to the A axis direction, and the plane formed by the hook portion 23a of the left spring 23 is set parallel to the B axis direction. As a result, the influence of the rolling is eliminated (described below in detail).

FIG. 12 illustrates a conventional example where the three springs 37 are hung as described above. Three balls 36 are arranged between the base member 34 and the lens holder 35, and hook portions of the three springs 37 are hung on the hook engaging portions 37a of the base member 34 and the lens holder 35, thereby enabling smooth movement of the lens holder 35 on a plane orthogonal to an optical axis.

Figure 13:
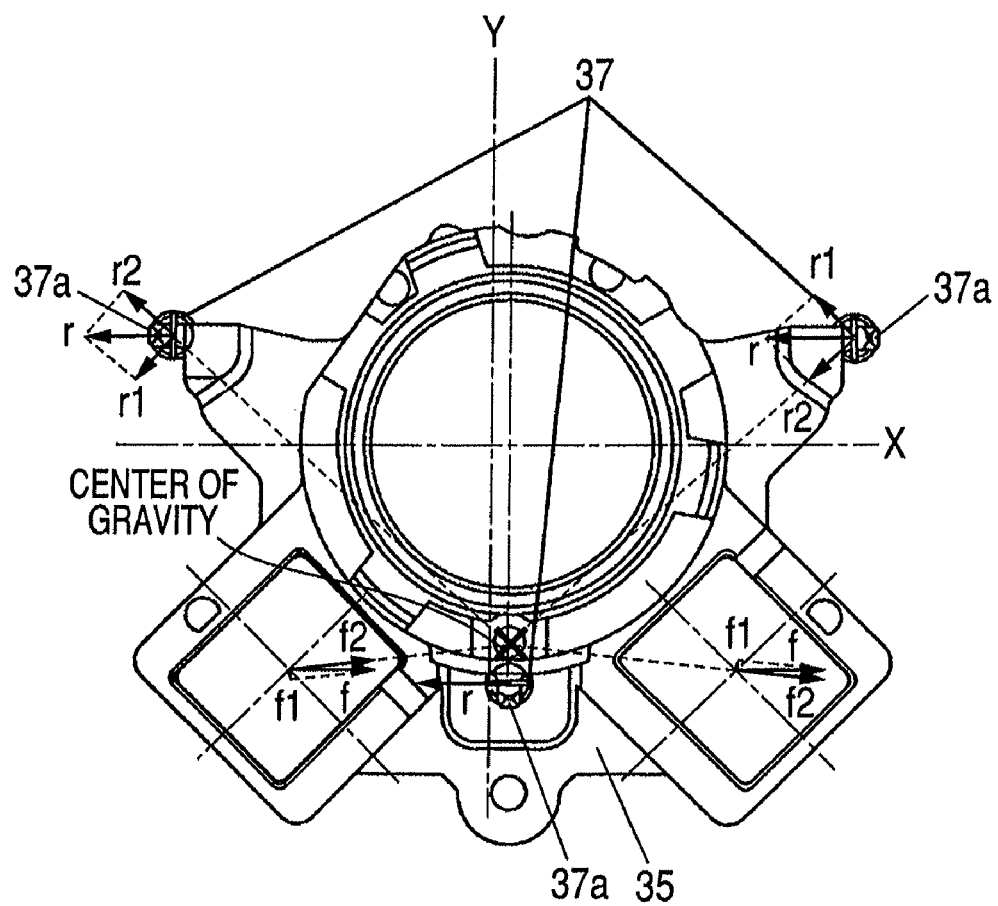
FIG. 13 is a view illustrating a force applied (in X direction) to the conventional lens holder.
Figure 14:
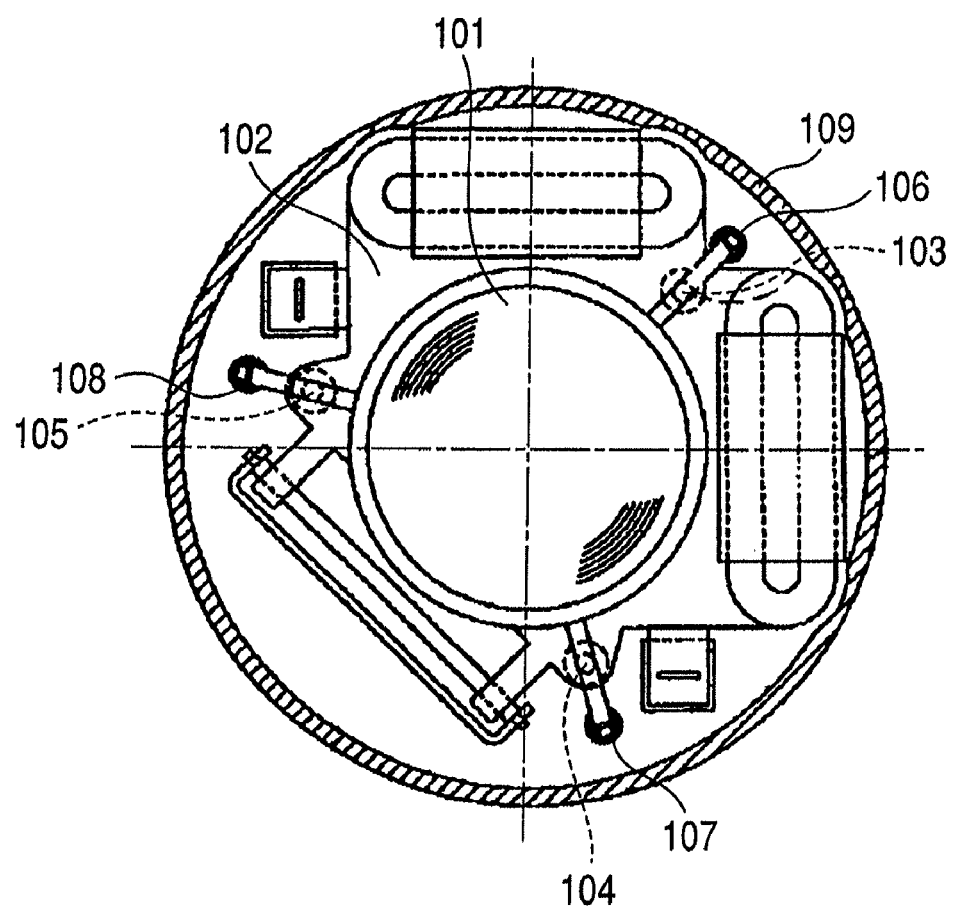
FIG. 14 is a plan view illustrating the optical apparatus included in the conventional camera.
Figure 15:
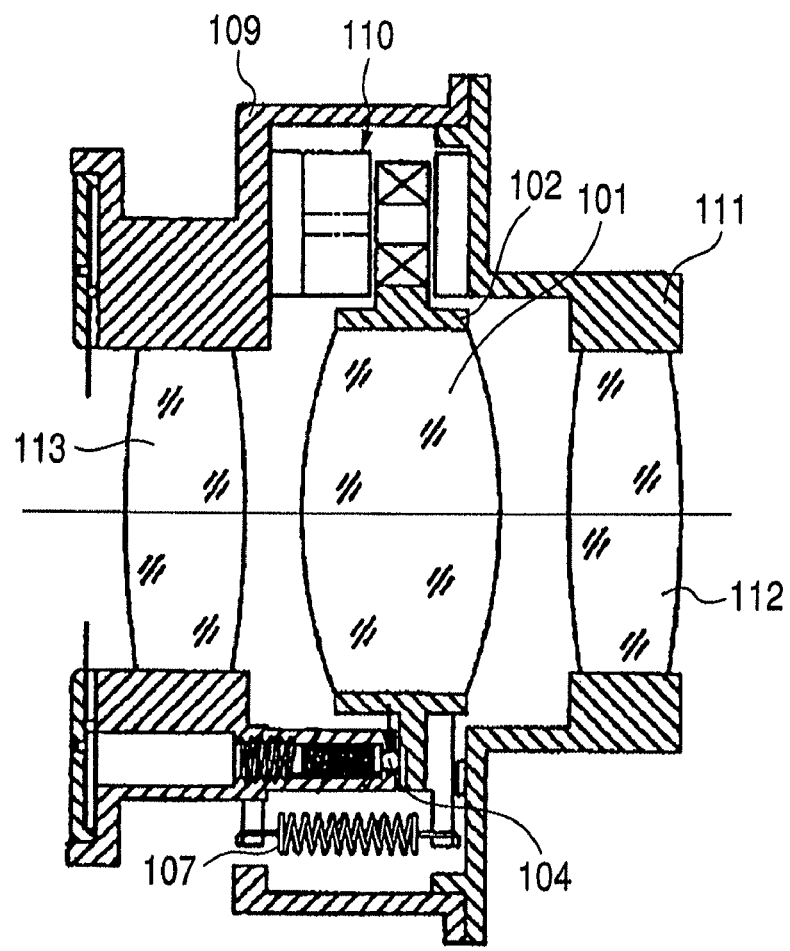
FIG. 15 is a sectional view illustrating the optical apparatus included in the conventional camera.

The springs 37 are hanged so that the two left and right springs 37 are hung in a manner that planes formed by their hook portions are parallel to a Y axis, and the center spring 37 is hung in a manner that a plane formed by its hook portion is parallel to an X axis. All the springs incline by 45° with respect to the driving directions A and B for the purpose of image blur correction. FIG. 13 illustrates a state where image blur correction driving has caused slight movement of the lens holder 35 having the three springs 37 thus hung along the X axis. The driving along the X axis generates the rolling force counterclockwise about the center of gravity. In FIG. 13, f denotes a driving force (resultant force) for image blur correction, and f1 and f2 denote its component forces.

In FIG. 13, a reaction force r against the driving force f for image blur correction is applied on the lens holder 35 by the three springs 37. In the two left and right springs 37, components forces r1 of reaction forces r are generated to rotate the lens holder 35 counterclockwise about the center of gravity. However, a reaction force r of the center spring 37 applies a force to cancel the component forces r1, thereby suppressing the rolling.

In other words, in the conventional configuration shown in FIGS. 12 and 13, if the center spring 37 is removed, because of the arrangements of the balls 36 and two left and right springs 37 excluding the center spring, the lens holder 35 falls toward the two springs 37 side to disable establishment of a an image stabilizing mechanism. Even without any consideration given to such falling, the forces of the two left and right springs work in a direction for increasing the rolling, damaging stabilizing performance.

FIG. 6 illustrates, as in the case shown in FIG. 13, a state where image blur correction driving has caused slight movement of the two-unit lens holder 21 of this embodiment to the right along the X axis in the drawing.

When a driving force (resultant force) F is applied for image blur correction, the two-unit lens holder 21 receives its reaction forces R from the two springs 23. The hook engaging portions 21a of the two-unit lens holder 21 accordingly receive the reaction forces R. However, degrees of the reaction forces R greatly vary depending on how the hook portions 23a of the springs 23 are engaged with the hook engaging portions 21a.

Figure 7:
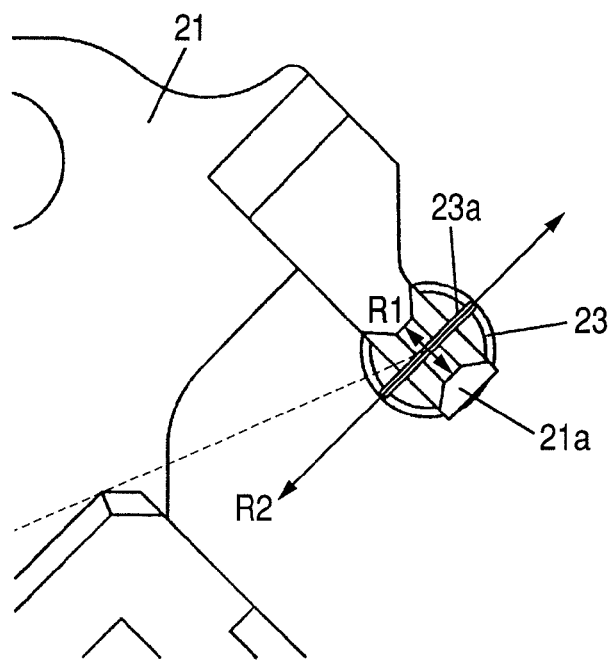
FIG. 7 is an enlarged view illustrating a friction force applied to a hook engaging portion of the lens holder of the embodiment of the present invention.

FIG. 7 is an enlarged view of a portion around the right hook engaging portion 21a of the two-unit lens holder 21 illustrated in FIG. 6.

The hook engaging portion 21a is formed in a shape so that a plane formed by the hook portion 23a of the spring 23 (plane including circular edge portion of spring) can be set in parallel with the A axis direction which is a driving direction for image blur correction. Conversely, though not shown in FIG. 7, the left hook engaging portion 21a is formed in a shape so that a plane formed by the hook portion 23a of the spring 23 (plane including circular edge portion of spring) can be set in parallel with the B axis direction which is a driving direction for image blur correction. Consequently, in the hook portion 23a of the spring 23, with respect to the hook engaging portion 21a of the two-unit lens holder 21, friction forces are greatly different between directions R1 and R2. The hook portion 23a of the spring 23 is positioned at a lowest point of a groove of the hook engaging portion 21a of the two-unit lens holder 21 by a spring force. Thus, even when the two-unit lens holder 21 is displaced in the R1 direction, the hook portion 23a rolls at the lowest point to absorb the displacement. When the two-unit lens holder 21 is displaced in the R2 direction, a contact point with the hook engaging portion 21a is always rubbed to change within a circle where the hook portion 23a is free. Rolling friction occurs between the hook engaging portion 21a and the hook portion 23a when displaced in the R1 direction (because the hook portion 23a rolls with respect to hook engaging portion 21a), and the friction force is extremely small. On the other hand, in the R2 direction, sliding friction occurs between the hook engaging portion 21a and the hook portion 23a when displaced in the R2 direction (because the hook portion 23a slides with respect to the hook engaging portion 21a), and thus a greatly large friction force is generated.

Figure 8:
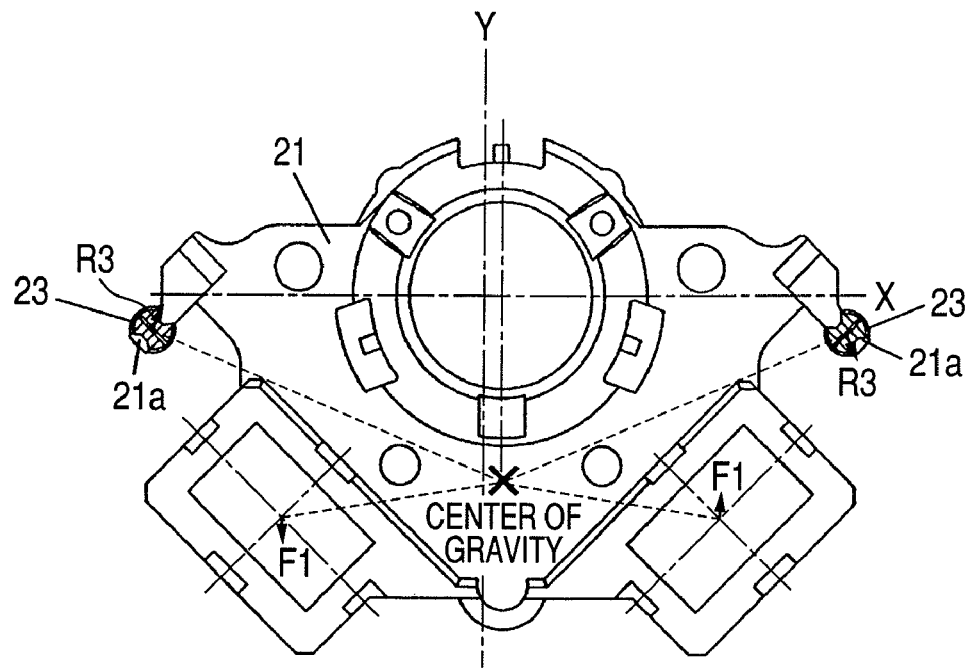
FIG. 8 is a view illustrating a force applied (in rotational direction) to the lens holder of the embodiment of the present invention.

Thus, when the reaction force R shown in FIG. 6 is divided into forces R1 and R2, a component force R2 of sliding friction is very large, becoming a friction force to ignore a component force R1. As a result, a force for rotating the two-unit lens holder 21 about the center of gravity appears as a resultant force R3 as illustrated in FIG. 8.

As described above, the rolling force generated during driving for image blur correction is a force F1 which rotates counterclockwise about the center of gravity. On the other hand, a resultant force R3 of a reaction force by from the spring 23 rotates clockwise about the center of gravity. It can accordingly be understood that this way of hanging the spring applies a force to cancel the rolling.

The case where the image blur correction driving has moved the two-unit lens holder 21 in an X direction has been described. Because of the laterally symmetrical shape, a result is the same when the two-unit lens holder 21 is moved in a direction (left side of FIG. 8) opposite to the X direction.

Figure 9:
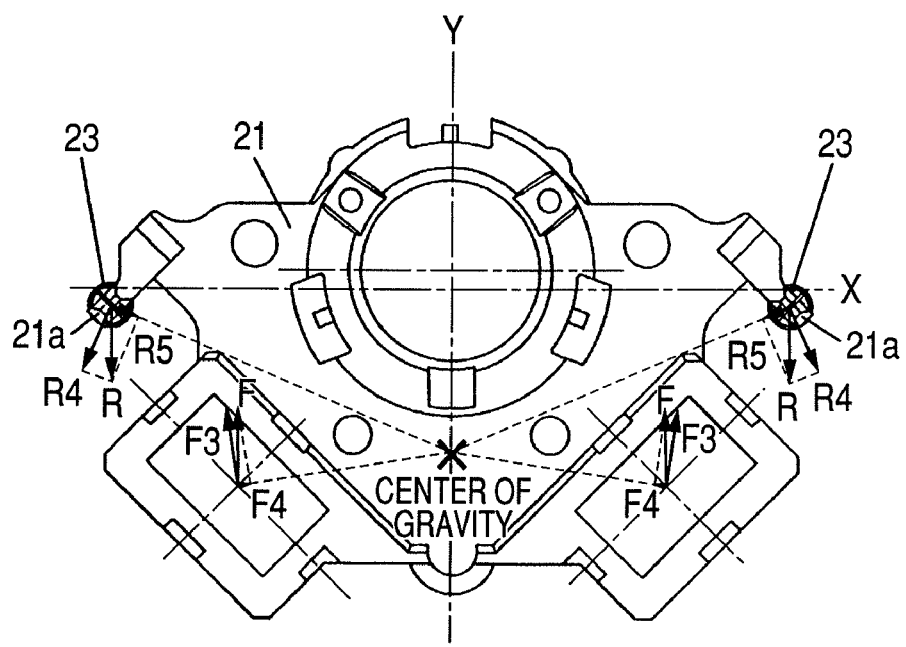
FIG. 9 is a view illustrating a force applied (in Y direction) to the lens holder of the embodiment of the present invention.

FIG. 9 illustrates a state in which the image blur correction driving has caused slight upward movement of the two-unit lens holder 21 along the Y axis of FIG. 9.

When a force F is applied as a resultant force of the image blur correction driving, the two-unit lens holder 21 receives its reaction forces R from the two springs 23. Forces generated during the image blur correction driving have component forces F3 and F4 of the resultant force F, and the component forces F3 are applied in directions of rotation made about the center of gravity. However, because of the laterally symmetrical shape of the two-unit lens holder 21 with respect to the Y axis, the component forces F3 are applied in directions for canceling each other. As a result, no rolling occurs. Component forces R4 and R5 of a reaction force R are generated, and the component forces R4 can be effective to rotate about the center of gravity. However, the component forces R4 are applied in directions for canceling each other for the same reason as that of the above, and thus no rolling occurs.

As described above in the case of the movement along the X axis shown in FIG. 6, in reality, the component forces R4 vary in strength/weakness depending on a way of hanging the spring 23. However, the component forces R4 still cancel each other, and thus detailed description thereof is omitted.

The case where the image blur correction driving has moved the two-unit lens holder 21 in a Y direction has been described. Because of the laterally symmetrical shape, the two-unit lens holder 21 is moved in a direction opposite to the Y direction (downward direction of FIG. 9), and hence, similarly, no rolling occurs.

Figure 10:
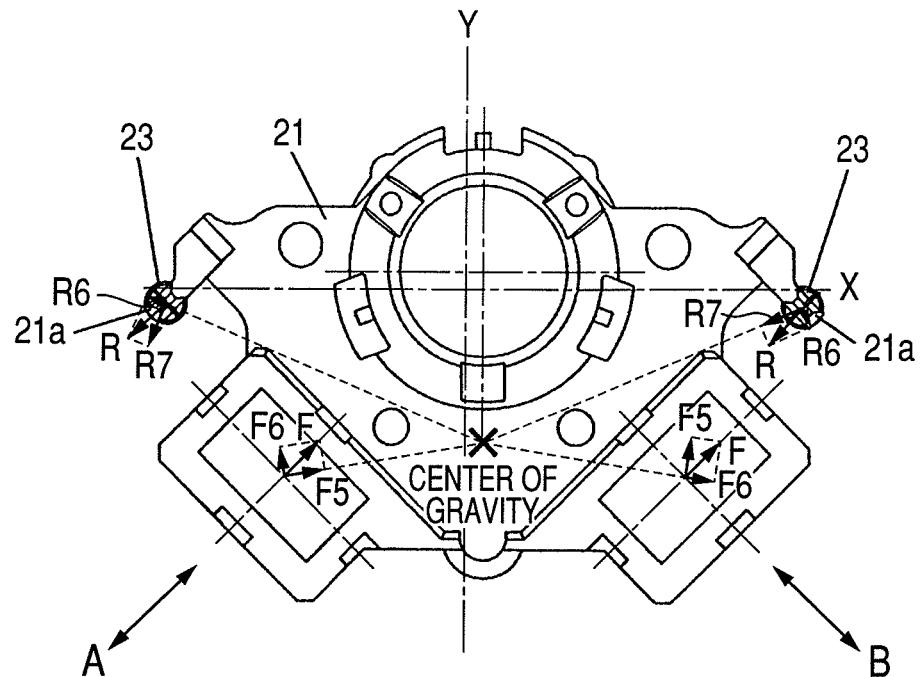
FIG. 10 is a view illustrating a force applied (in A direction) to the lens holder of the embodiment of the present invention.

FIG. 10 illustrates a state in which the image blur correction driving has caused slight obliquely right upward movement of the two-unit lens holder 21 along the A axis of FIG. 10.

When a force F is applied as a resultant force of the image blur correction driving, the two-unit lens holder 21 receives its reaction forces R from the two springs 23. Forces generated during the image blur correction driving have component forces F5 and F6 of the resultant force F. The component force F5 in the right side and the component force F6 in the left side are the forces effective to rotate the two-unit lens holder 21 about the center of gravity. Due to F5 in the right side >F6 in the left side, a force of a difference therebetween generates the rolling which is to rotate the two-unit lens holder 21 counterclockwise about the center of gravity. The forces that the two-unit lens holder 21 receives as the reaction forces from the springs 23 are different depending on friction forces of the left and right hook engaging portions 21a as described above. In this case, the reaction force R of the right side which is sliding friction is much stronger than the reaction force R of the left side which is rolling friction.

Thus, a magnitude relation of the component forces is R7 in the left side >R6 in the right side in FIG. 10. When friction forces are taken into consideration, however, a magnitude relation of actually applied forces is R6 in the right side >R7 in the left side, and a force is applied in a direction of rotation made clockwise about the center of gravity. Also in this case, the application of the reaction force rotated clockwise with respect to the rolling rotated counterclockwise reduces the rolling.

The case where the image blur correction driving has moved the two-unit lens holder 21 in the A axis direction has been described. Because of the laterally symmetrical shape, the two-unit lens holder 21 is moved in a direction opposite to the A axis direction (obliquely left downward direction of FIG. 10), similarly resulting in a reduction of the rolling.

Figure 11:
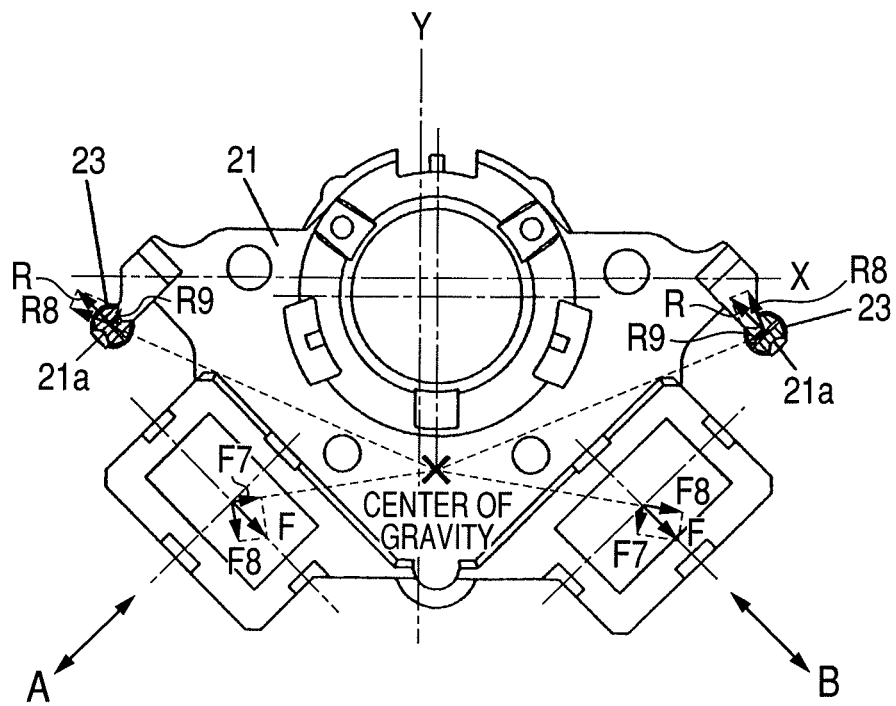
FIG. 11 is a view illustrating a force applied (in B direction) to the lens holder of the embodiment of the present invention.

FIG. 11 illustrates a state in which the image blur correction driving has caused slight obliquely right downward movement of the two-unit lens holder 21 along the B axis shown in FIG. 11.

When a force F is applied as a resultant force of the image blur correction driving, the two-unit lens holder 21 receives its reaction forces R from the two springs 23. Forces generated during the image blur correction driving have component forces F7 and F8 of the resultant force F. The component force F7 in the right side and the component force F8 in the left side are the forces effective to rotate the two-unit lens holder 21 about the center of gravity. Due to F8 in the left side >F7 in the right side, a force of a difference therebetween generates the rolling which is to rotate the two-unit lens holder 21 counterclockwise about the center of gravity. The forces that the two-unit lens holder 21 receives as the reaction forces from the springs 23 are different depending on friction forces of the left and right hook engaging portions 21a as described above. In this case, the reaction force R of the left side which is sliding friction is much stronger than the reaction force R of the right side which is rolling friction.

Thus, a magnitude relation of the component forces is R8 in the right side >R9 in the left side in FIG. 11. When friction forces are taken into consideration, however, a magnitude relation of actually applied forces is R9 in the left side >R8 in the right side, and a force is applied in a direction of rotation made clockwise about the center of gravity. Also in this case, the application of the reaction force rotated clockwise with respect to the rolling rotated counterclockwise reduces the rolling.

The case where the image blur correction driving has moved the two-unit lens holder 21 in the B axis direction has been described. Because of the laterally symmetrical shape, when the two-unit lens holder 21 is moved in a direction opposite to the B axis direction (obliquely left upward direction of FIG. 11), similarly resulting in a reduction of rolling.

The cases where the two-unit lens holder 21 is driven in the X and Y directions and the A and B axis directions in the XY plane have been described. In all the cases, it can be understood that when the rolling is about to occur, spring forces are applied in directions for canceling the rolling.

Even when the two-unit lens holder 21 is moved in a driving direction other than the above-mentioned directions, this case is a combination of driving of any of the above-mentioned cases. When the rolling is about to occur, similarly to the above-mentioned cases, a spring force is applied in a direction for canceling the rolling.

The embodiment has been described by way of case where the forces are applied on the magnets 22A and 22B during the image blur correction driving. However, even the other cases (force of gravity and external inertial force) may be considered similar because they can be described by forces applied on magnets which occupy predominant portions of weight of a lens holder.

The optical apparatus of the embodiment described above includes the two-unit lens holder 21 which holds the correction lens 26 movably within the plane orthogonal to the optical axis relatively to the two-unit base member 28. The optical apparatus further includes one of the two magnets 22A and 22B and the coil units 24A and 24B for moving the two-unit lens holder 21, and the three balls 25 held between the two-unit base member 28 and the two-unit lens holder 21. The optical apparatus yet further includes the two springs 23 for applying biases so that the hook portions 23a disposed in one and the other ends of the two springs 23 can be engaged with the two-unit base member 28 and the two-unit lens holder 21, respectively, and the three balls 25 can be held between the two-unit base member 28 and the two-unit lens holder 21.

The optical apparatus is configured in such a manner that the magnets 22A and 22B are mounted, and a center of gravity of the two-unit lens holder 21 holding the correction lens 26, in other words, a center of gravity of the two-unit lens holder 21 in its driven state, is present in the triangle formed by the three balls 25. This positional relation is based on the state in which the two-unit lens holder 21 is lifted so that the center of the correction lens 26 can match the optical axis of another photographing lens optical system, in other words, the correction lens 26 can be in a center position. The magnets 22A and 22B or the coil units 24A and 24B, the balls 25, and the springs 23 are arranged so that the line segment within the plane formed by the two springs 23 can traverse (may intersect) the two sides of the triangle formed by the balls 25 substantially equally. The line segment formed by the two springs 23 is more specifically a line segment formed by the two hook engaging portions 21a.

As a result, the number of components can be reduced, and assembling performance can be improved.

Drive unit including one of the two magnets 22A and 22B and the coil units 24A and 24B is for moving the two-unit lens holder 21 in the A axis direction (first direction) and the B axis direction (second direction) orthogonal to the A axis direction. The hook engaging portion 21a of the two-unit lens holder 21 is disposed for the hook portion 23a so that the plane formed by the hook portion 23a of one of the two springs 23 can be parallel to the A axis direction. Similarly, the hook engaging portion 21a of the two-unit lens holder 21 is disposed for the hook portion 23a so that the plane formed by the hook portion 23a of another spring can be parallel to the B axis direction.

The plane formed by the hook portion 23a of the spring 23 is a plane which includes the circular edge portion of the spring 23. The plane formed by the hook portion 23a of the spring 23 located near one of the magnets 22A and 22B or one of the coil units 24A and 24B which moves the two-unit lens holder 21 in the A axis direction is orthogonal to the A axis direction. Similarly, a direction of the hook portion 23a of the spring 23 located near the other of the magnets 22A and 22B or the other of the coil units 24A and 24B which moves the two-unit lens holder 21 in the B axis direction is orthogonal to the B axis direction.

Thus, the optical apparatus capable of preventing the rolling only by the two springs excluding the center spring difficult to be hung between the two-unit lens holder 21 and the two-unit base member 28 can be realized. As a result, the present invention greatly contributes to a reduction of the number of components and improvement of assembling performance, and is advantageous for downsizing a camera.

The embodiment has been described by way of configuration in which the magnets 22A and 22B are mounted to the two-unit lens holder 21. However, the same holds true for a configuration in which the coil units 24A and 24B are mounted to the two-unit lens holder 21. In this case, the magnets 22A and 22B are mounted to the two-unit base member 28. For a center of gravity, a center of gravity of the two-unit lens holder 21 which has the coil units 24A and 24B mounted thereto and holds the correction lens 26, in other words, a center of gravity of the two-unit lens holder 21 in its driven state, may be taken into consideration.

The embodiment has been described by way of example of its application to the camera which is an image pickup apparatus provided with the optical apparatus. However, the present invention can be applied to an optical apparatus such as a cellular phone or a binocular provided with an image pickup function capable of correcting image blurring.

EFFECTS OF THE INVENTION

The present invention can provide the optical apparatus and the image pickup apparatus capable of reducing the number of components and improving assembling performance.

This application claims the benefit of Japanese Patent Application No. 2008-010445, filed Jan. 21, 2008 which is hereby incorporated by reference herein in its entirety.

The invention claimed is:

1. An optical apparatus, comprising:
   a base member;
   a lens holder which holds a compensation lens to compensate for image blurring by moving the compensation lens in a direction not parallel to an optical axis, wherein the lens holder has two hook engaging portions;
   a drive unit configured to move the lens holder with respect to the base member;
   three balls arranged between the base member and the lens holder, wherein the three balls are arranged so that a center of gravity of the lens holder is positioned within a triangle formed by the three balls, when an optical axis of the compensation lens is in a position matching the optical axis of another lens of the optical apparatus, and
   two springs configured to bias the lens holder toward the base member, wherein the two springs are arranged in a manner that a line segment interconnecting the hook engaging portions intersects two sides of the triangle when seen from a direction of the optical axis of the compensation lens.

2. An optical apparatus according to claim 1, wherein the drive unit comprises a magnet and a coil, and moves the lens holder in a first direction and a second direction orthogonal to the first direction with respect to the base member.

3. An optical apparatus according to claim 2, wherein one of the magnet and the coil is fixed to the lens holder and the other is fixed to the base member.

4. An optical apparatus according to claim 3, wherein the one of the magnet and the coil is fixed to the lens holder, and the center of gravity of the lens holder is a center of gravity of the lens holder in a state in which the compensation lens and the one of the magnet and the coil fixed to the lens holder are mounted.

5. An optical apparatus according to claim 1,
   wherein the drive unit moves the lens holder in a first direction and a second direction orthogonal to the first direction, and
   wherein each of the two bias members including hook portions which are disposed at both ends thereof and engaged with hook engaging portions of the base member and the lens holder, and the hook engaging portions of the lens holder are disposed for the hook portions of each of the two bias members in a manner that a plane formed by the hook portion of one of the two bias members is parallel to the first direction, and a plane formed by the hook portion of another one of the two bias members is parallel to the second direction.

6. An optical apparatus according to claim 1, wherein each of the two bias members including hook portions which are disposed at both ends thereof and engaged with hook engaging portions of the base member and the lens holder, and planes formed by the hook portions of the two bias members are planes including circular edge portions of the two bias members, the plane formed by the hook portion of one of the two bias members located near the drive unit which moves the lens holder in the first direction is orthogonal to the first direction, and the plane formed by the hook portion of another one of the two bias members located near the drive unit which moves the lens holder in the second direction is orthogonal to the second direction.

7. An image pickup apparatus comprising the optical apparatus according to claim 1.

* * * * *